United States Patent [19]

Dravnieks

[11] Patent Number: 4,793,541
[45] Date of Patent: Dec. 27, 1988

[54] SOLDERING GUN HAVING FINGER ACTUATED FEED UNIT APPARATUS

[75] Inventor: Konstantins Dravnieks, Thiensville, Wis.

[73] Assignee: International Development, Inc., Thiensville, Wis.

[21] Appl. No.: 99,246

[22] Filed: Sep. 21, 1987

[51] Int. Cl.$^4$ ............................................. B23K 3/02
[52] U.S. Cl. ........................................ 228/52; 228/53; 219/229
[58] Field of Search .......................... 228/41, 52, 53; 219/229, 230

[56] References Cited

U.S. PATENT DOCUMENTS

| | | | |
|---|---|---|---|
| 1,152,043 | 8/1915 | Orme | 228/52 |
| 2,014,728 | 9/1935 | Forney | 219/27 |
| 2,058,634 | 10/1936 | Rusk | 113/109 |
| 2,280,879 | 4/1942 | Anderson | 113/109 |
| 2,432,428 | 12/1947 | Lang | 228/52 |
| 2,444,267 | 6/1948 | Pereira | 113/109 |
| 2,952,763 | 9/1960 | Gustafsson | 228/53 |
| 3,181,763 | 5/1965 | Koga | 228/53 |
| 3,211,355 | 10/1965 | Zoltai | 228/52 |
| 3,232,509 | 2/1966 | Newton | 226/127 |
| 3,252,645 | 5/1966 | Zoltai | 228/52 |
| 3,261,390 | 7/1966 | Saito et al. | 228/53 |
| 3,521,804 | 7/1970 | Jacobs | 228/52 |
| 3,707,258 | 12/1972 | Schlitt | 228/52 |
| 3,796,856 | 3/1974 | Wei-Cheng | 228/53 |
| 3,966,109 | 6/1976 | Hogan | 228/52 |
| 4,138,048 | 2/1979 | Lemmon | 228/52 |
| 4,199,096 | 4/1980 | Keefe et al. | 228/52 |
| 4,247,137 | 1/1981 | St. Clair | 228/52 |
| 4,330,075 | 5/1982 | Rosen | 228/53 |
| 4,411,379 | 10/1983 | Gravel | 228/52 |
| 4,507,545 | 5/1985 | Riordan | 228/51 |

Primary Examiner—M. Jordan
Assistant Examiner—Samuel M. Heinrich
Attorney, Agent, or Firm—Andrus, Sceales, Starke & Sawall

[57] ABSTRACT

A soldering gun has a finger actuated rotary solder feed unit and a solder cartridge releasably coupled to the gun. A solder guide tube extends forwardly parallel to the cylinder and guides the solder into engagement with the heated tip. The guide tube is mounted for vertical and angular orientation relative to the cylinder for locating the solder relative to the tip. A rotating ratchet feed wheel is connected to the trigger and has teeth engaging the underside of the solder. A set screw is located in the path of trigger to adjust the trigger stroke and thereby the length of the solder fed to the tip. A pressure wheel is mounted to firmly hold the solder to the feed wheel and is secured to a spring-loaded and pivoted T-shaped lever within the gun housing. The T-shaped lever has the pressure wheel rotatably mounted in the cross bar and the stem projecting upwardly into engagement with a bias spring. The lever has a release arm for manual pivoting of the lever to release of the solder. The solder cartridge has a tongue projecting into the gun. The lever has a latch arm and engageable with a recess of the tongue cartridge to releasably lock the cartridge in place. The gun barrel includes a releasably mounted heated cylinder terminating in a soldering tip.

15 Claims, 2 Drawing Sheets

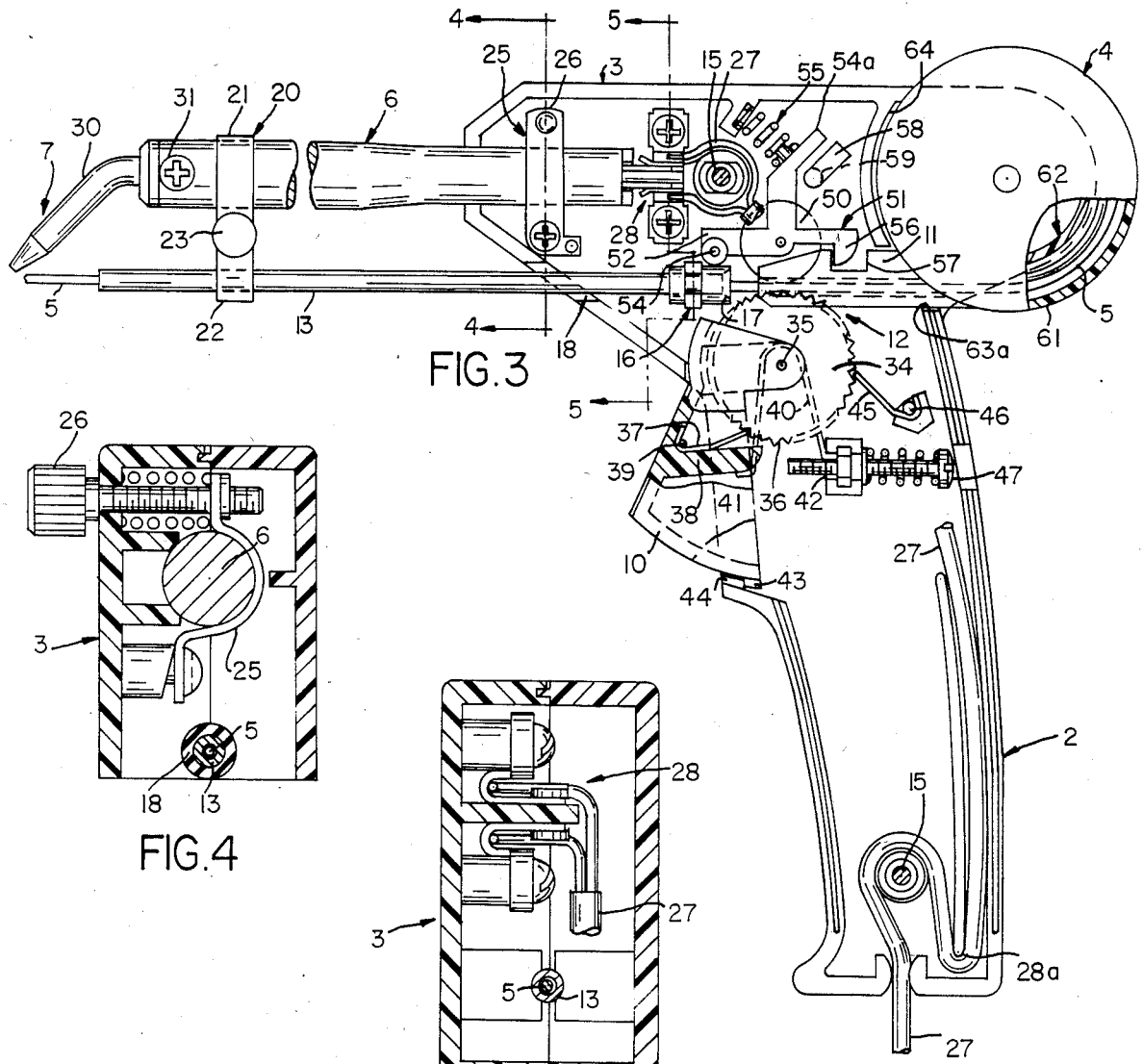
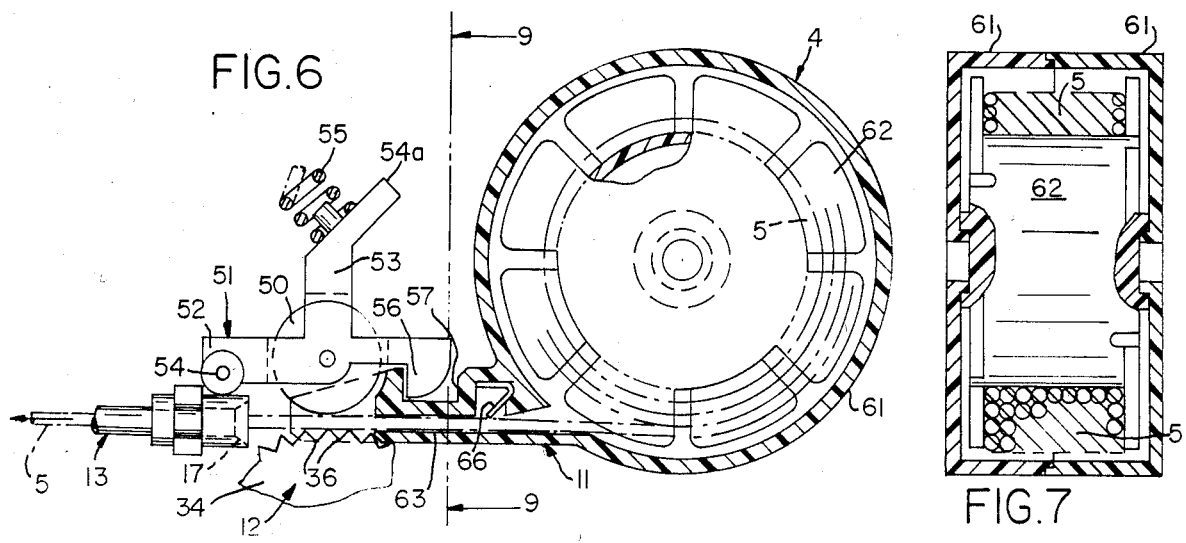

SOLDERING GUN HAVING FINGER ACTUATED FEED UNIT APPARATUS

BACKGROUND OF THE PRESENT INVENTION

The present invention is related to a soldering gun having a finger actuated soldering feed apparatus and particularly to such a soldering gun of a pistol-type construction.

Electrical components are often connected into circuit by soldering of the electrical terminals to other components, wires, conductors, and the like. Various forms of soldering devices have been developed. A particularly useful soldering apparatus for production line construction of electrical circuits includes a pistol-type soldering gun having a finger actuated solder feeding apparatus or mechanism. A pistol-type soldering gun, for example as shown in U.S. Pat. No. 4,199,096 which issued Apr. 22, 1980, provides a satisfactory type of construction. In such pistol-type apparatus, a depending handle is integrated into the back portion of a solder wire feed barrel. A heated soldering member is secured projecting from the barrel and terminates in the outer end in a pointed heated tip. A suitable electrical heating unit in the member is coupled to the tip to raise the temperature of the tip for heating and melting of the solder wire. The heating unit is connected in the circuit through a lead mechanism extending rearwardly through the barrel and generally out through the handle structure. A suitable on/off control switch may be provided for selected melting of the solder. A coil of the solder wire is mounted directly to the gun and fed through the barrel in alignment with the tip for feeding the end of the wire into engagement with the tip end thereby providing for melting of the end of the solder wire and depositing of the melted solder accurately onto a circuit assembly. A trigger in the handle of the gun actuates a feeding mechanism for controlled feeding of the wire onto the tip.

Various feeding mechanisms have been suggested in the prior art. The above patent for example illustrates a pivoted and spring-load feedarm coupled to trigger wherein the depression of the trigger moves the spring-load feeded arm forwardly. The arm engages the wire and moves the wire forwardly through the barrel. Upon release of the trigger, the spring loading of the pivoted arms allows the arm to slide rearwardly over the wire into a reset position for the subsequent feed. The length of wire fed with each trigger actuation can be preset through an adjustable mechanism varying the length of the stroke.

Alternate types of soldering gun devices are shown in the other patent art wherein a pencil type soldering gun terminates in a heated tip with means for feeding of a solder wire through the pencil unit into engagement with the heated tip. For example, U.S. Pat. No. 4,507,545 which issued on Mar. 26, 1985 discloses a pencil-type soldering gun having a finger actuated wheel for driving of the soldering wire forwardly through the pencil unit. The finger actuated wheel is coupled to a knurled wheel engaging the wire such that rotation of the wheels propels the soldering wire through the apparatus. U.S. Pat. No. 1,925,656 which issued Sept. 5, 1933 also discloses a pencil type unit with finger actuated input wheel operating a feed wheel with the solder wire moving between the feed wheel and a spring loaded back wheel.

A solder gun with a similar feed wheel connected to a trigger is available from Hakko Metal Industries, Ltd. of Ozaka, Japan. In the structure, a ratchet wheel is coupled to a finger actuated trigger for rotating the ratchet wheel. The solder wire is clamped between the ratchet wheel and an opposing pressure roll which is loaded by a fixed hair-pin spring to continuously hold the pressure roll into biased engagement with the wheel and/or the solder wire. It is difficult to remove the cartridge as a result of the continued pressurized engagement of the solder wire by the wheel feed mechanism. Other solder feed units are shown in the following U.S. Patents:

| U.S. Pat. No. | Issue Date | Inventor |
|---|---|---|
| 2,014,728 | 08-27-1934 | Forney |
| 2,058,634 | 10-27-1936 | Rusk |
| 2,280,879 | 04-28-1942 | Anderson |
| 2,444,267 | 06-29-1948 | Pereira |
| 3,211,355 | 10-12-1965 | Zoltai |
| 3,232,509 | 02-01-1966 | Newton |
| 3,252,645 | 05-24-1966 | Zoltai |
| 3,521,804 | 07-28-1970 | Jacobs |
| 4,199,096 | 04-22-1980 | Keefe et al |
| 4,247,137 | 01-27-1981 | St. Clair |
| 4,330,075 | 05-18-1982 | Rosen |
| 4,411,379 | 10-25-1983 | Gravel |

Notwithstanding the various devices which have been proposed including those which are commercially available, there is a continuing demand and need for a simpler, effective and reliable soldering gun apparatus of the pistol type construction, preferably including a coil wire cartridge releasably mounted to the gun for efficient production line soldering.

SUMMARY OF THE PRESENT INVENTION

The present invention is particularly directed to a soldering gun apparatus of the pistol type construction and including a resiliently loaded and finger actuated rotary solder wire feed mechanism for accurate feeding of the solder wire, and having an improved solder wire cartridge for releasable coupling of the solder wire supply to the gun for holding the supply of solder wire. More particularly, in accordance with the teaching of the present invention, a pistol-type housing is provided having a barrel and a depending handle with a feeding trigger. The trigger is coupled to a rotating ratcheted feed wheel for establishing an input drive to a solder wire supply feeding through the back portion of the barrel. The ratchet feed wheel is a relatively fine tooth ratchet wheel having the upper surface substantially defining the lower plane of the feed path of the solder wire. During reset of the trigger, the ratchet wheel is fixed by ratchet spring so that the solder is moved only forward by the movement of the trigger. A pressure wheel is mounted in outwardly spaced alignment with the feed wheel to firmly grasp the wire for forward feed movement. The pressure wheel is coupled or secured to a pivoted lever within the housing and is resiliently loaded and biased into engagement with the ratchet wheel. A release projection extends from the pivoted lever for manual positioning of the wheel and loading and release of the feeding mechanism for corresponding feeding of the solder wire and/or release thereof as necessary or desired. In a preferred construction, a wire cartridge is releasably secured to the back of the gun with a coupling member projection into the gun. The pivoted wheel lever includes an integral cartridge latch arm located to the back side of the pressure wheel and engageable with the member of the cartridge to releasably lock the cartridge in place.

More particularly of the preferred construction of the present invention, the ratchet wheel mechanism includes a spring loaded feed arm coupled to the trigger. The ratchet member is coupled to the wheel with an adjustable means for varying the length of the feed by varying the number of teeth rotated with each actuation of the trigger. The adjustment means can be a simple screw adjustment in the path of trigger and thereby adjusting the trigger stroke and rotation of the wheel with each trigger actuation.

The resiliently loaded pressure wheel includes a generally T-shaped lever pivoted at the forward end of the cross-bar to the housing. The pressure wheel is rotatably mounted on the cross bar to the pivoted side of the stem and with the opposite end of the cross bar extending rearwardly. The stem member projects upwardly. A bias spring acts between a stop in the housing and the upper end of the stem and urges the lever and the wheel into engagement with the feed wheel. The back of the barrel includes a cartridge opening generally in alignment with the feed path of the solder wire. The cartridge is constructed with an internal coil of the solder wire and with a discharge tongue extending peripherally from the cartridge. The end of the wire extends through the discharge tongue. The tongue is adapted to be fitted into the gun opening and includes an interlocking element engaged with the spring loaded lever for pressurized releasable coupling of the cartridge to the gun. Pivoting of the pressure wheel lever releases the latch for removal of the cartridge including the wire fed into the pressure wheel mechanism. Thus, the rearwardly projecting end of the crossbar is formed with a depending tab or lip and the tongue includes a recess to receive the lip to lock the cartridge in the housing.

The barrel structure of the gun includes a releasably mounted heated cylinder secured to the forward end of the insulating housing. The cylinder terminates in a soldering tip, and is releasably secured in place. Various sized wattage cylinders are conveniently provided for adapting the gun to various soldering loads.

A guide tube extends forwardly as a part of the barel structure for guiding of the solder wire through the gun into engagement with the heated tip. The cylinder is preferably constructed with the tip located above the path of the solder wire guide tube such that the solder wire is fed through the gun into engagement with the underside of the heated tip.

The guide tube is constructed to permit limited vertical and angular orientation relative to the cylinder and thereby the solder wire about the heated tip. This permits the operator to provide optimum positioning of the end of the solder wire into engagement with the heated tip for optimum melting and depositing of the solder.

The present invention has been found to provide a simplified feeding mechanism which is readily mass produced at a minimal cost. Each of the components is constructed with present technology, and the mechanism requires a minimum number of simple, reliable components. The resulting gun however provides accurate positioning and feeding of the solder wire, with a convenient and reliable cartridge supply.

BRIEF DESCRIPTION OF DRAWINGS

The drawings furnished herewith generally illustrate the best mode presently contemplated for the invention and are described hereinafter.

In the drawing:

FIG. 3 is an enlarged vertical longitudinal section through the gun shown in FIG. 1;

FIG. 4 is a vertical section taken generally on line 4—4 of FIG. 3;

FIG. 5 is a fragmentary horizontal section taken generally on line 5—5 of FIG. 3;

FIGS. 6 and 7 illustrate the solder supply cartridge and is coupling to the gun as shown in FIGS. 1-3;

DESCRIPTION OF THE ILLUSTRATED EMBODIMENT

Figure 1:
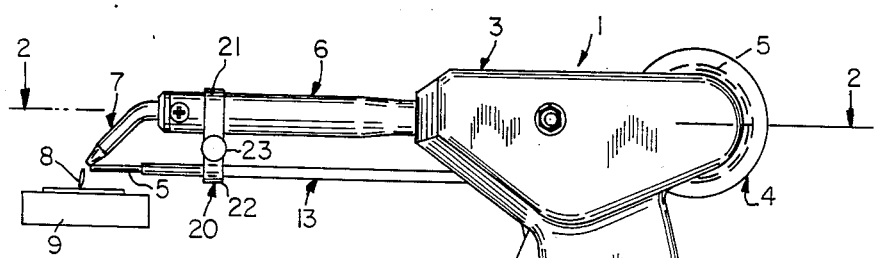
FIG. 1 is a side elevational view of a soldering gun constructed in accordance with the teaching of the present invention.

Referring to the drawings and particularly to FIG. 1, a hand-held soldering gun 1 is illustrated with a pistol-type construction. The gun 1 includes depending handle 2 and a forwardly extended barrel 3. A releasable cartridge 4 is secured to the back of the gun and includes a supply of solder wire 5. The wire 5 is fed through the upper portion of the gun including the forwardly projecting barrel 3, which includes a forwardly extending heater cylinder 6 terminating at the outer end in a heated tip 7.

The heated tip 7 melts the solder wire 5 and gravity forces dropping the solder 8 onto a work member 9, such as an electrical circuit board for interconnecting of circuit components. The gun 1 includes a finger operated trigger 10 in the handle 2 moving a predetermined length of the solder wire 5 through the gun to the heated tip 7 for depositing of relatively precise amounts of solder 8 for each actuation of the trigger 10. As more clearly shown in the sectional view of the FIG. 3, the solder wire cartridge 4 includes a tongue 11 projecting inwardly of the back end of the gun barrel 3. The wire 5 extends from the tongue through a feed wheel mechanism or unit 12. The trigger 10 is coupled to rotate the feed wheel unit 12 a predetermined degree of rotation and provides for a repeatable and corresponding movement of a predetermined length of the solder wire 5 from the cartridge 4. A wire guide tube 13 is secured to the forward end of the barrel 3 for directing of the wire 5 into engagement with the heated tip 7.

More particularly, in the illustrated embodiment of the invention, the gun 1 includes a two piece housing of insulating material such as plastic which is essentially split along the longitudinal axis of the gun. The housing includes the depending handle portion 2 and the a barrel portion 3 to which the heater cylinder 6 and the guide tube 13 are releasably secured as more fully developed hereinafter. The housing is formed of an appropriate molded plastic or other suitable electrical and heat insulating material. The housing is molded with the various pivot pins and stops of the feed mechanism and cartridge support as presently described. The housing parts are releasably secured to each other as by suitable nut and bolt units 15 to hold and support the mechanisms in place.

The guide tube 13 is an elongated metal tube which has the one end clamped between opposed recessed walls in the forward end of the plastic barrel 3 as at 16. When the plastic housings are secured together, the clamp walls 16 firmly hold the tube 13 within the housing. The inner end of the tube 13 is flared as at 17 to enlarge the tube opening for reliable movement of the solder wire into the tube. The guide tube 13 projects forwardly through an opening 18 in the forward wall of the housing. The opening for the tube 13 is slightly enlarged and may be sealed with a soft rubber-like sleeve, not shown, and defines a further support for the guide tube and guiding of the wire accurately into engagement with the heated tip.

The outer end of the guide tube 13 terminates into slightly spaced relation to the heated tip 7. The guide tube 13 extends forwardly generally in alignment with the heater cylinder 6. The outer end of the guide tube 13 is releasably supported on the cylinder by an encircling clamp unit 20. The illustrated clamp unit 20 includes a split U-shaped member 21 having a base portion encircling the cylinder 6 and depending parallel clamp arms 22 extending downwardly to the opposite sides of the tube 22. A clamp bolt unit 23 passes through the clamp arms 22 between the guide tube 13 and the cylinder 6. Tightening of the clamp bolt draws the opposite parallel arms together to firmly engage the cylinder 6 an the guide tube 13 and hold the guide tube in place. The illustrated clamp structure permits limited vertical orientation of the guide tube 13 within the parallel arms 22 with respect to the tip 7. The cylinder encircling base of the clamp 21 also permits limited angular orientation of the guide tube 13 about the cylinder 6 and corresponding orientation with respect to the tip. The combined limited movement of the guide tube permits precise orientation of the end of the solder wire with respect to the tip melting of the solder wire.

The heater cylinder 6 is of a known suitable construction and consists of a heating coils, not shown, or other elements within the cylinder 6. The one end of cylinder 6 is clamped rigidly within the forward end of the barrel 3 immediately above the guide tube 13, as at 25. As shown in FIGS. 3 and 4, the upper end of clamp 25 includes a spring-loaded and threaded clamp bolt 26 threaded into the clamp 25 and operable from the side of the housing for releasing and replacing of the cylinder 6. The inner end of the cylinder 6 is provided with electrical terminals connected to a pair of power lines 27 by a spring-loaded terminal unit 28. The power leads 27 are threaded downwardly through the barrel and the handle 2 and extends outwardly through the handle structure. The line 27 is wound through a channel and pin member 28a in the lower end of the handle to secure the wire in place and prevent pulling of the lead wire from the handle. The line 27 is thereby located with reliable interconnection to the cylinder to the terminals.

The cylinder 6 is releasably held in place by clamp bolt 26 to permit replacement with cylinders of different wattages. The heated tip 7 is a solid metal member having a shank 30 which projects into the cylinder. The shank 30 is releasable secured to the cylinder by a clamping screw 31 which threads through the cylinder into clamping engagement with the shank. The shank, as most clearly shown in FIG. 3, includes an angled portion terminating in the outer cone-shaped tip and with the outer most end essentially aligned with the center of the guide tube 13. The clamping screw 31 permits replacement of the tip 7 for different soldering functions and the like.

Figure 2:
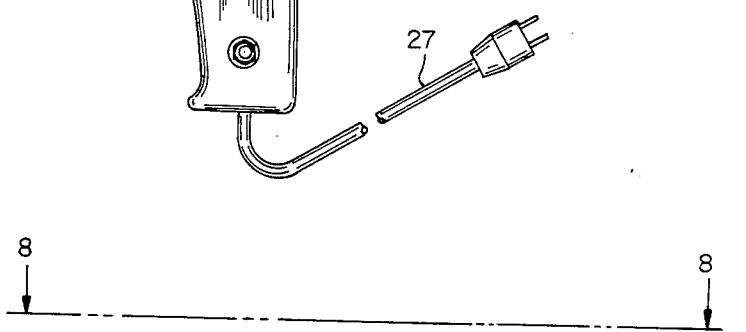
FIG. 2 is a top plan view with parts broken away and sectioned to show certain detail of construction.
Figure 8:
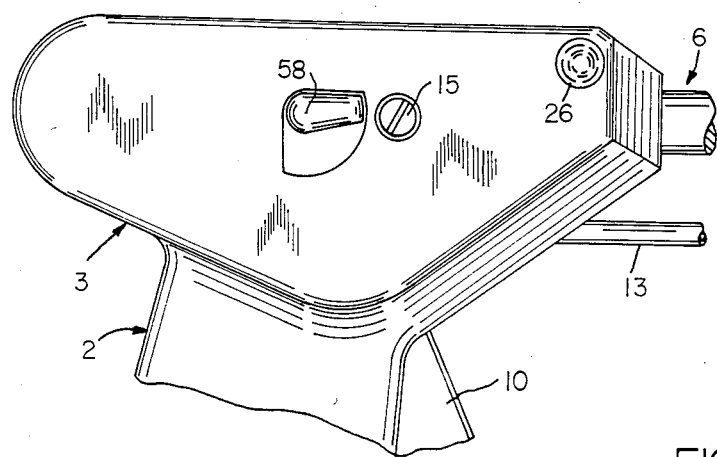
FIG. 8 is view taken generally on line 8—8 of FIG. 2.

The feed wheel mechanism or unit 12 is located within the housing immediately rearwardly of the inner most clamped end of the guide tube. The feed wheel unit 12 includes a relatively large ratchet wheel 34 rotatably disposed on a shaft 35 within the housing. The shaft 35 is shown as a metal pin which is secured within suitable molded hubs in the opposite halves of the housing. The ratchet wheel 34 is accurately located with its upper surface essentially located in the lower plane of the solder wire 5 as the wire moves from the cartridge 4 to the guide tube 13. The ratchet wheel 34 includes spaced ratchet teeth 36 with the ratchet teeth 36 engaging the solder wire 5. the teeth 36 are formed by adjacent surface foring a 90° angle. The teeth 36 engaging solder 5 project outwardly toward the guide tube 13 such that rotation of the wheel engages and propels the solder wire 5 toward and through the guide tube 13, as the result of counterclockwise rotation as viewed in FIGS. 2 and 6.

The trigger 10 is a generally fan-shaped member of a thickness somewhat in excess of that of the wheel, with the upper or inner end pivoted upon the ratchet wheel shaft 3.. The trigger 10 is generally hollow and is adapted to telescope into the housing over the wheel 34. A drive spring 37 is secured to a support wall within the trigger. The spring is shown as a generally L-shaped member which abuts an L-shaped wall 38 and is secured thereto by a small pin 39 projecting through the trigger. The spring 37 includes a drive arm which projects outwardly into engagement with the ratchet wheel and in particular a tooth 36 on the lower portion of the ratchet wheel 34. The outer end of the drive arm thus engages a tooth on the ratchet wheel such that depressing the trigger 10 causes the wheel 34 to rotate. The flexibility of the spring is such that it maintains engagement with the tooth while it rotates. A hairpin return spring 40 extend one each over the opposite ends of ratchet wheel shaft 35. One end of the hairpin spring 40 engages a lateral wall 41 of the trigger 10. The opposite end of the hairpin spring abutts a wall 42 of the housing. The spring 40 in the mounted position is compressed and creates an expanding force urging the trigger 10 outwardly of the housing. The lower end of the trigger 10 includes a depending stop wall or lip 43 which engages an abuttment 44 in the housing immediately adjacent the trigger 10 housing opening to limit the outward movement of the trigger and establishes the reset and normal standby position of the trigger. The depression of the trigger 10 to actuate the ratchet wheel 34 further compresses the return spring 40 such that upon release of the trigger, the trigger returns to its standby position.

An L-shaped ratchet spring 45 is secured within the housing, angularaly spaced about wheel 34 with respect to the drive spring 37. The ratchet spring 45 is thus an L-shaped member which is secured within an L-shaped abutting wall of the housing including a pin 46. The spring 45 has a spring arm extending forwardly with the outer end engaging a tooth on the wheel 34 preventing the reverse rotation of the ratchet wheel.

The extent of the ratchet wheel rotation, and thereby the length solder wire fed to top movement is determined by the stroke of the trigger 10, with return rotation presented by the ratchet spring 45. The degree of trigger movement is controlled by an adjustable set screw 47 threaded through a nut held in the wall 42, as shown in FIG. 3, of the handle. The inner end of a spring-loaded set screw 47 is aligned with the path of spring wall 41 of the trigger 10. The position of the set screw 47 determines the stroke of the trigger 10 and thereby the angular rotation of the ratchet wheel 34. The set screw 47 can readily be adjusted to vary the movement in steps of the ratchet teeth, for example, between one and six teeth.

The opposed pressure wheel 50 is a smooth surfaced wheel rotatably mounted in a spring loaded pivot lever 51 to urge the solder wire 5 into firm frictional engagement with the ratchet wheel 34 and thereby provide for positive forward positioning and movement of the solder wire. The illustrated lever 51 is generally a T-shaped member having with the pressure wheel rotatably mounted within the cross bar 52 and the stem 53. The lever 51 is located in an inverted position within the housing with the pressure wheel 50 aligned with the ratchet wheel 34 and with the crossbar 52 extending longtitudinally of the housing parallel to the line of movement of the solder wire 5. The forward end of the crossbar 52 is pivotally secured by a pivot connection 54 within the housing. The illustrated pivot connection 54 includes a metal pin passing through an opening in the end of the crossbar 52 and secured within suitable hubs in the housing halfs. The stem 53 of the lever projects outwardly into general spaced alignment with a stop wall 54, which is locate at an angle to the stem 53. The upper end of stem 53 is offset as at 54a in generally parallel relation to the stop wall with stem 53 vertically oriented. A bias coil spring 55, located between the stop wall and the lever stem, is compressed therebetween and urges the lever 51 to pivot toward the ratchet wheel 34. The spring 55 loads the pressure wheel 50 and with the ratchet wheel 34 and firmly holds the solder wire 5 in transport engagement with the ratchet wheel 34. The combination of the smooth backing wheel and the ratchet wheel provides for a reliable and effective step movement of the solder wire from the cartridge to the tip.

The opposite or rearwardly extension of the crossbar 52 terminates in slightly spaced relation to the backwall of the housing. The crossbar 52 lies generally above the travel path of the wire 5 from the cartridge 4. The crossbar 52 includes a depending locking lip 56 which engages with a recess 57 on the cartridge tongue 11 to releasably lock the cartridge 4 in place under normal operation, as shown in FIGS. 3 and 4. To release the cartridge 4, the pressure wheel lever 51 is moved to disengage the latch unit and simultaneously relieve the pressure on the solder wire 5, thereby permitting ready withdrawal of the cartridge and the extended portion of the solder.

A release cam 58 is rotatably mounted within the housing adjacent the outer end of the stem 53 in alignment with the stem wall 54a. Rotation of the cam 58, in a counterclockwise direction as viewed in FIG. 3, engages the stem 53 and pivots the lever 51 against the bias of the spring 55. The lever then pivots in a counterclockwise direction about its pivot support 54 and lifts the pressure wheel 50 from the path of the solder wire 5 to release the solder wire 5 and the cartridge 4.

The cam shaft 59 projects outwardly through the side of the housing and terminates in a lever arm 59a located for convenient operation by the operator, for insertion and removal of cartridge 4.

The cartridge 4 includes an outer round housing 61 with a solder wheel 62 rotatably mounted within the housing. The housing is formed of a suitable plastic establishing a rigid support for the unit. Discharge tongue 11 is integrally formed to the housing and projects outwardly as a linear rigid extension of the round housing. The tongue 11 has an outlet passageway 63 for transfer of the discharge end of the solder wire into the gun. The solder wire 5 is wound as a coil on the wheel and is freely withdrawn by pulling outwardly with a slight pressure on free end of the solder wire.

Figure 9:
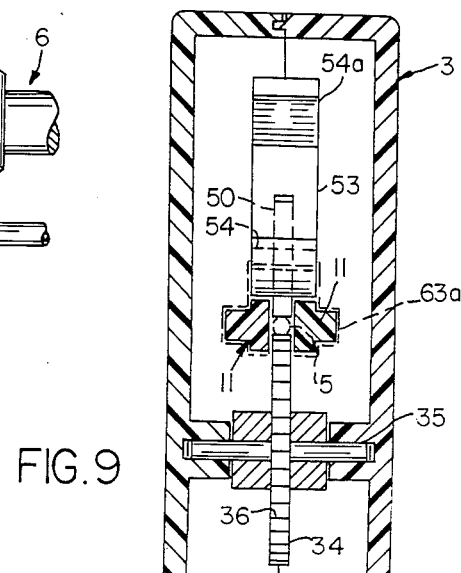
FIG. 9 is a view taken generally on line 9—9 of FIG. 6.

The tongue 11 has a relatively rectangular cross section with offset portions and is adapted to project inwardly through a corresponding opening 63a (FIGS. 3 and 9) in the back wall of the gun barrel 3. The back wall of the barrel is provided with a cartridge receiving recess 64, having an inner curved wall which is curved generally to correspond to the outer diameter of the cartridge housing. The back wall opening is aligned with the common portions of the ratchet wheel 34 and the pressure wheel 50. The innermost end of the tongue 11 is bifurcated and projects to the opposite sides of the ratchet feed wheel and the pressure wheel. The inner ends of side arms of the tongue are incline as at 65 and, engage the pressure wheel to pivot the pressure wheel assembly and permit convenient introduction of the solder wire therebetween. The wire discharge opening 63 in the tongue is also closely spaced between the feed and pressure wheels such that the solder wire moves directly into the pressure gap therebetween.

A spring arm 66 is also secured within the tongue portion 11 to engage and prevent return movement of solder wire 5 backwardly into the cartridge 4. The illustrated spring 66 is a flat spring arm secured to the upper interior wall of the tongue and extending downwardly and forwardly into engagement with the solder wire. The spring thus prevents the end of the solder from being inadvertently pushed back into the cartridge.

The cartridge 4 is reliably held in place during operation by the latch end 56 of lever 51. Upon release of the lever, the cartridge 4 is readily removed and withdrawn, with spring 66 insuring removal of the solder from the gun 1.

The pressurized wheel unit 12 with the lever mounted backing wheel 50 establishes a reliable and accurate feed of selected lengths of solder to tip 7.

Although shown with a cartridge solder supply, a separate supply can be used with the wire directly through the gun into the wheel unit 12.

Various modes of carrying out the invention are contemplated a being within the scope of the following claims particularly pointing out and distinctly claiming the subject matter which is regarded as the invention:

I claim:

1. A soldering gun apparatus for feeding a solder wire to work, comprising:
a barrel member for passing solder wire therethrough and a depending handle portion for manipulation of the gun, a guide means for guiding of the wire form said barrel member, a feed wheel adapted to engage the wire and feed the wire through said barrel member and into said guide means, trigger means in said handle for rotating said feed wheel, a pressure wheel rotatably secured within said barrel in alignment with said feed wheel and including a pivoted support lever and a resilient means pivoting the lever and pressure wheel toward the feed wheel and establishing resilient engagement between the feed wheel and pressure wheel with the solder wire in the barrel between said feed wheel and said pressure wheel, release means coupled to said lever for positively moving said lever in order to space said pressure wheel form said feed wheel.

2. The solder gun apparatus of claim 1 including a wire cartridge adapted to be releasably mounted to said gun and including a wire guide member projecting into said housing, said pivoted support lever means including a latch means operatively engaging said guide member for releasably latching of said cartridge to said gun.

3. A soldering gun apparatus for feeding a solder wire to work, comprising a barrel member for passing solder wire therethrough and a depending handle portion for manipulation of the gun, a guide means for guiding of the wire from said barrel member, a feed wheel adapted to engage the wire and feed the wire through said barrel member and into said guide means, trigger means in said handle for rotating said feed wheel, a pressure wheel rotatably secured within said barrel in alignment with said feed wheel and including a pivotal support lever and a resilient means pivoting the lever and pressure wheel toward the feed wheel and establishing resilient engagement between the feed wheel and pressure wheel with the solder wire in the barrel, wherein the guide means includes a guide tube releasably secured to the forward end of said barrel member and projecting outwardly therefrom, a heating unit including a cylinder extending forwardly from said barrel and terminating in a soldering tip located outwardly of said wire guide tube, said cylinder having a longitudinal axis parallel to said guide tube, a clamp means coupled to said cylinder and including depending means extending downwardly to said guide tube, releasable means to firmly clamp said clamp means to said cylinder and to said guide tube to support said guide tube in predetermined orientation with respect to said cylinder and said soldering tip, said clamp means permitting angular displacement of said tube about said cylinder and in the plane through the longitudinal axis of said cylinder for optimum orientation of said wire guide tube with respect to said soldering tip.

4. The soldering gun apparatus of claim 3 wherein said clamp means includes a U-shaped member extended about the cylinder and having depending parallel arms extending downwardly to the opposite sides of said guide tube, and said releasable means is coupled to said arms for collapsing the arms and securing the member to the cylinder and tube.

5. The soldering gun apparatus of claim 1 wherein said barrel includes a back wall having an opening for receiving of a solder wire, a cartridge having a feed tongue extending linearly therefrom, said back wall opening and said tongue having substantially mating configurations whereby said tongue is adapted to be extended inwardly into said gun in alignment with said feed element and said pressure means, said support means and said tongue having cooperating members establishing a releasable latch of said tongue within said housing to hold said cartridge to said barrel.

6. A soldering gun apparatus, comprising a housing having a depending handle portion and a solder wire feeding barrel portion, a guide means for guiding of a flexible solder wire through said barrel portion, feed wheel means within said housing including a rotatably mount ratcheted feed wheel and an opposing pressure wheel located to the top and bottom of said solder wire and lateral guide members within said barrel to the opposite sides of the solder wire and located to laterally confine said solder wire between said feed wheel and said pressure wheel to positively support the wire, a lever means pivotally mounted in said body portion, means rotatably mounting said pressure wheel on said lever, resilient means urging said pressure wheel toward said ratchet wheel and a trigger means secured to said depending handle portion and operable to actuate said ratcheted feed wheel for movement of said solder wire.

7. The solder wire feed apparatus of claim 6 wherein said guide means includes a rigid guide tube secured to said barrel portion extending forwardly from said lateral guide members and said barrel portion, a heater cylinder, means securing the tube to said cylinder for adjustable positioning of said tube.

8. The apparatus of claim 6 including a trigger means stop secured to said dependent handle portion and to said trigger means and operable to limit the movement of the trigger means and thereby the movement of said solder wire.

9. The soldering gun apparatus of claim 6 wherein the guide means includes a guide tube releasably secured to the forward end of said barrel and projecting outwardly therefrom, a heating unit including a cylinder extending forwardly from said barrel and terminating in a soldering tip located outwardly of said wire guide tube, said cylinder having a longitudinal axis parallel to said guide tube, a clamp means encircling said heating unit and including depending arm means extending downwardly to the opposite sides of said guide tube, releasably means for collapsing of said arms to firmly clamp said clamp means to said heating unit and to said guide tube to support said guide tube in predetermined orientation with respect to said cylinder and said soldering tip, said clamp means permitting angular displacement of said tube about said cylinder, and in the plane through the longitudinal axis of said cylinder for optimum orientation of said wire guide with respect to said soldering tip.

10. The soldering gun apparatus of claim 6 including a heater cylinder secured to the forward end of said barrel portion and extending outwardly therefrom, said cylinder having a forward end, a soldering tip unit secured to said forward end of said cylinder and having a portion extending at an angle to the cylinder and terminating in a solder melting cone-shaped tip, said guide means including a wire guide tube secured to the forward end of said barrel beneath said cylinder and extending outwardly into alignment with the underside of said tip and terminating in spaced relation to said tip, and an adjustable support unit connecting said guide tube to said cylinder.

11. The apparatus of claim 10 wherein said adjustable support unit includes a generally U-shaped clamp member encircling said cylinder and having parallel depending arms extending downwardly to the opposite sides of said guide tube, a clamping bolt unit passing through said arms between said cylinder and said guide tube and operable to clamp said arms and thereby clamp said guide tube in adjustable fixed reaction relative to said cylinder for establishing angular orientation of said guide tube and linear orientation of said guide tube with respect to said tip.

12. The apparatus of claim 6 wherein said lever means includes a T-shaped lever having a crossbar and a stem, pivot means secured to one end of the crossbar to pivotally mount said lever to said housing, said pressure wheel being rotatably mounted on said lever, said stem extending outwardly of said wheel, said resilient means including a spring member coupled to said stem and pivoting said lever to move said pressure wheel towards the ratchet wheel, a release means secured to said lever and extended through the outer wall of said housing to permit manual positioning of said lever to compress said spring and hold said pressure wheel spaced from said solder wire.

13. A soldering gun apparatus, comprising a housing having a depending handle portion and a wire feeding barrel portion, a guide means for guiding of a flexible solder wire through said barrel portion, feed wheel means within said housing including a rotatably mount ratcheted feed wheel and an opposing pressure wheel, a lever means pivotally mounted in said body portion, means rotatably mounting said pressure wheel on said lever, and resilient means urging said pressure wheel toward said ratchet wheel and a trigger means secured to said dependent handle portion and operable to actuate said ratcheted wheel means from movement of said solder wire, a wire cartridge adapted to be releasably mounted to said gun and including a wire discharge member projecting into said barrel portion, said lever including a latch means operatively engaging said discharge member for latching of said cartridge to said barrel portion.

14. A soldering gun apparatus for hand manipulation and for feeding solder wire to work, comprising a plastic housing including a barrel portion and an integrated depending handle portion, a heater cylinder secured to the forward end of said barrel portion and extending outwardly therefrom, a soldering tip unit secured to the outer end of said cylinder and having an outer portion extending at an angle to said cylinder and terminating in a solder melting cone-shaped tip, a wire guide secured to the forward end of said barrel beneath said cylinder and extending outwardly into alignment with the underside of said tip, a clamp unit including a generally U-shaped clamp member having a portion encircling said cylinder and having parallel depending arms extending downwardly to the opposite sides of said guide tube, a clamping bolt unit passing through said arms between said cylinder and said guide tube and operable to clamp said arms and thereby secure said guide tube in fixed relation relative to said cylinder, said clamp unit establishing angular orientation of said guide tube with respect to said tip and linear orientation of said guide tube between said clamping arms, a ratchet wheel rotatably mounted within said handle portion, a trigger unit coupled to rotate said wheel for moving of said solder wire through said barrel portion, a pressure wheel located within said barrel and in opposed alignment with said ratchet wheel and operable to hold said solder wire in engagement with said ratchet wheel, a pressure wheel lever pivotally mounted in said housing, said pressure wheel being rotatably mounted on said lever, said lever including an upwardly and outwardly extending stem, a spring member coupled to said stem and pivoting said lever to move said pressure wheel towards the ratchet wheel, a release means secured to said lever and extended through the outer wall of said housing to permit manual positioning of said lever to compress said spring and hold said wheel spaced from said solder wire.

15. The solder gun apparatus of claim 14 wherein said lever includes an arm extending rearwardly toward the back wall of said barrel, said back wall having an opening, a cartridge having a feed tongue extending linearly therefrom, said back wall opening and said tongue having substantially mating configuration whereby said tongue is adapted to be extended inwardly into said gun in alignment with the ratchet wheel and said pressure wheel, said latch arm and said tongue having cooperating members establishing a releasable latch of said tongue within said housing to hold said cartridge to said gun.

* * * * *

UNITED STATES PATENT AND TRADEMARK OFFICE
CERTIFICATE OF CORRECTION

PATENT NO. : 4,793,541

DATED : December 27, 1988

INVENTOR(S) : Konstantins Dravnieks

It is certified that error appears in the above-identified patent and that said Letters Patent is hereby corrected as shown below:

IN THE CLAIMS: Col. 8, line 60, delete "form" and substitute therefor ---from---; Col. 9, line 6, delete "form" and substitute therefor ---from---; Col. 9, line 7, delete "solder" and substitute therefor ---soldering---; Col. 9, line 10, delete "means"; Col. 10, line 34, delete "releasably" and substitute therefor ---releasable---; Col. 10, line 63, delete "reaction" and substitute therefor ---relation---; Col. 12, line 33, delete "configuration" and substitute therefor ---configurations---.

Signed and Sealed this

Tenth Day of October, 1989

Attest:

DONALD J. QUIGG

Attesting Officer

Commissioner of Patents and Trademarks